United States Patent [19]

Igarashi et al.

[11] 3,953,169
[45] Apr. 27, 1976

[54] PAPERBOARD IMPREGNATED WITH POLYURETHANE RESIN

[75] Inventors: Seiichi Igarashi, Suita; Kin-ichi Shirakawa, Ibaraki; Kazuo Kimura, Kobe; Akira Ogino, Shinsenri-Higashi, all of Japan

[73] Assignee: Takeda Chemical Ind., Ltd., Japan

[22] Filed: Sept. 5, 1974

[21] Appl. No.: 503,514

Related U.S. Application Data

[63] Continuation of Ser. No. 852,750, Aug. 25, 1969, abandoned.

[30] Foreign Application Priority Data

Aug. 27, 1968 Japan.............................. 43-61321

[52] U.S. Cl................................. 8/192; 8/DIG. 11; 428/425; 428/537; 260/77.5 NC; 260/77.5 AP
[51] Int. Cl.² ................. D06M 13/34; D21H 1/40

[58] Field of Search................. 117/155 R, 161 KP; 428/424, 425, 537; 8/192, DIG. 11; 260/77.5 NC, 77.5 AP

[56] References Cited
UNITED STATES PATENTS

| 3,178,310 | 4/1965 | Berger et al. .................... 117/155 R |
| 3,413,144 | 11/1968 | LaCombe et al. ............... 117/155 R |

Primary Examiner—Michael R. Lusignan
Attorney, Agent, or Firm—Wenderoth, Lind & Ponack

[57] ABSTRACT

A paperboard impregnated with polyurethane resin having specific NCO content and average molecular weight at the rate of 0.05 to 5.0 weight percent relative to the paperboard has excellent mechanical properties such as compressive strength, tensile strength, tearing strength, folding endurance, etc., even in wet state.

5 Claims, 1 Drawing Figure

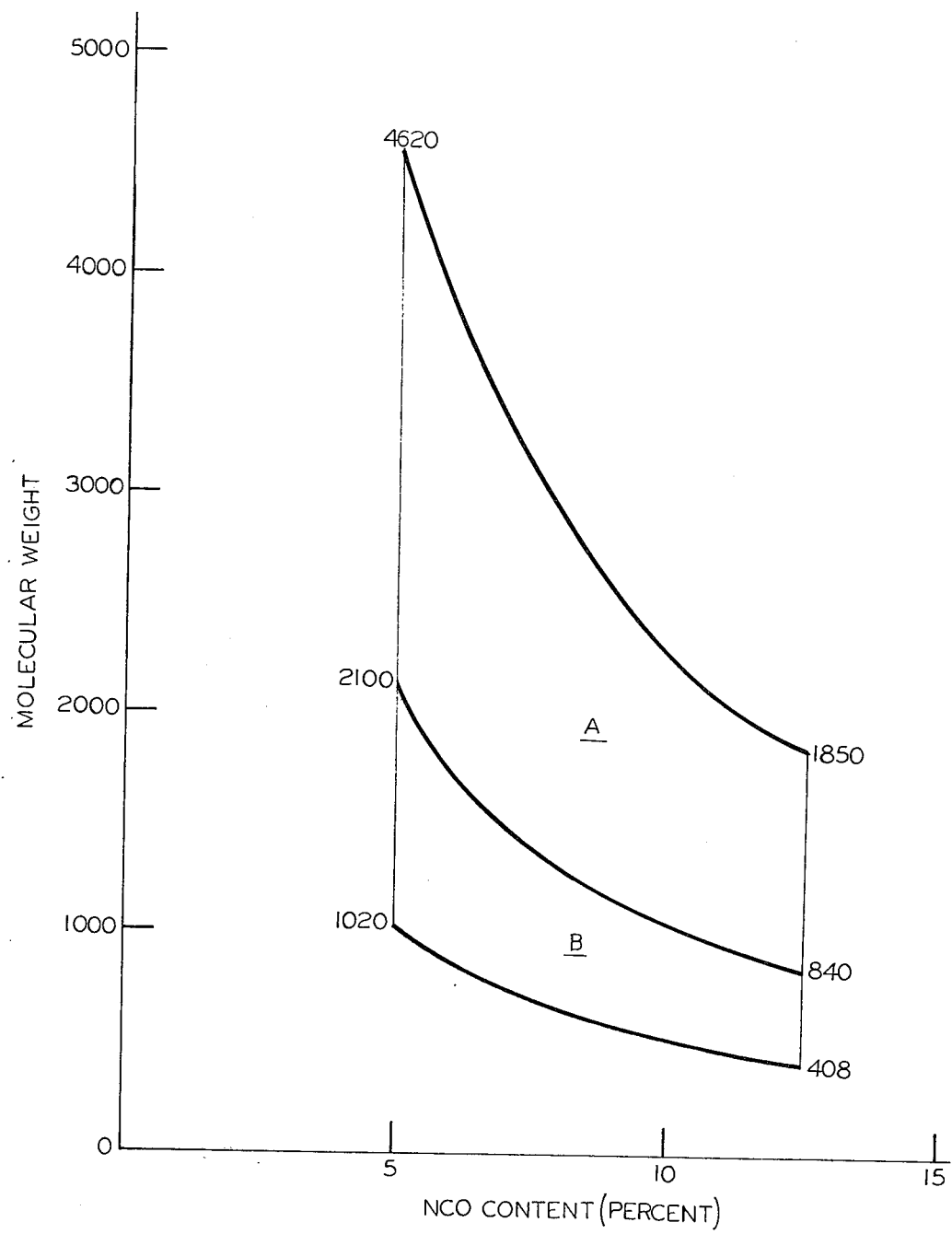

PAPERBOARD IMPREGNATED WITH POLYURETHANE RESIN

This is a continuation of application Ser. No. 852,750 filed Aug. 25, 1969, now abandoned.

This invention relates to a paperboard impregnated with polyurethane resin, more particularly, to the paperboard having high compressive, tensile and tearing strength even in the state of wet, and sufficient flexibility.

Paperboards can generally be used as linerboards and corrugating media in corrugated fiber boards.

There are known several kinds of paperboards treated with an organic solution of resin such as melamine, acryl, polyacrylamide resin, etc. In those paperboards, however, compressive strength can be improved only at the cost of flexibility. Some expedient compromise is sought between these two attributes, however, it is still impossible to obtain a product that will meet the expectations in compressive, tensile and tearing strength and other properties. Moreover, in the processes of strengthening paperboard, there have been left problems still unsolved, such as penetrability of the resin into a porous paper of comparatively tight formation, viscosity of the resin and those incidental to the drying process. Therefore, those paperboards are not satisfactorily made use of in practical fields.

It has now been discovered that the paperboard impregnated with polyurethane resin, being polyisocyanate derived from tolylene diisocyanate or composition of polyol and polyisocyanate derived from tolylene diisocyanate and having certain defined NCO content and average molecular weight, in a specific range of the amount is satisfactory in various properties such as compressive strength, tensile strength, tearing strength, flexibility, moisture penetrability, printability, etc.

The paperboard of this invention can be obtained by impregnating a paperboard with an organic solution of the specific polyurethane resin.

Polyurethane resin used in this invention may be either one-component polyisocyanate derived from tolylene diisocyanate having the NCO content (weight %) and the average molecular weight shown by a scope A in the FIG. 1, or two-component polyisocyanate composition of polyol and polyisocyanate derived from tolylene diisocyanate having the NCO content (weight %) of the composition calculated by the formula described below and an average molecular weight of at least one of the components of the composition shown by the scope A or B in the FIG. 1.

The NCO content (weight %) of the polyurethane resin employed in this invention, as clearly shown by the FIG. 1, is within the range of 5 to 12.5 weight % based on the resin to be impregnated. When the polyurethane resin is in a form of composition, the NCO content (weight %) is calculated by the following formula $$\frac{Xx}{X+Y}$$

wherein $x$ is NCO content (weight %) of polyisocyanate, X is the amount of polyisocyanate employed and Y is the amount of polyol employed.

The average molecular weight is measured by Vapour Pressure Osmometer Model 301[refer to by S. Kume and H. Kobayashi "Makromolekulare Chemie" 79, 1 (1964)].

When the NCO content of the polyurethane resin used in this invention is below 5%, the resulting paperboard has not the desired strength. On the other hand, the NCO content of the resin over 12.5% results in a poor folding endurance while compressive strength will be sufficient. When the average molecular weight of one-component polyisocyanate or at least one of the components of the two-component polyisocyanate composition is outside the upper line of the scope A in the FIG. 1, the polyurethane resin causes gellation. And, when the average molecular weight of one-component polyisocyanate is outside the lower line of the scope A or an average molecular weight of at least one of the components of the two-component polyisocyanate composition is outside the line of the scope B in the FIG. 1, it is impossible to obtain a resulting paperboard having the desired mechanical strength.

As the polyisocyanate, there may be used polyisocyanate compounds such as a reaction product between 2,4- or 2,6-tolylene diisocyanate or the mixture thereof and low molecular polyol having three or more hydroxyl groups (e.g. trimethylol ethane, trimethylol propane, glycerin, erythritol, pentaerythritol, 1,2,6-hexanetriol) or a mixture of said polyol and diol (e.g. ethylene glycol, propylene glycol, butylene glycol) and a reaction product of tolylene diisocyanate with polyesterpolyol or polyetherpolyol.

The polyisocyanate may include isocyanurate ring in its molecule such as trimerization products of the above reaction products and a product originating from trimer of tolylene diisocyanate.

As the polyester polyol or polyether polyol to be reacted with tolylene diisocyanate and a polyol component to be used as a partner in the two-component polyisocyanate composition, the following materials may be exemplified.

1. A polyether polyol derived from an alkylene oxide (e.g. ethyleneoxide or propylene oxide) and diol having a low molecular weight (e.g. ethylene glycol, propylene glycol butylene glycol), triol having a low molecular weight (e.g. glycerine, trimethylolpropane or 1,2,6-hexanetriol), or tetraol (e.g. erythritol or pentaerythritol), or a mixture of any of the acid polyether polyols with a polyalkylene glycol (e.g. polyethylene glycol, polypropylene glycol, polytetramethylene glycol, etc.).

2. A polyester polyol obtained by the reaction of low molecular polyol with a low molecular carboxylic acid. As for the low molecular polyol, there may be used trimethylolethane, trimethlolpropane, glycerine, pentaerythritol, ethylene glycol, propylene glycol, 1,4 and 1,3-butanediol, 1,6-hexanediol, etc., while the low molecular carboxylic acid may be any of adipic acid, succinic acid, maleic acid, phthalic acid, terephthalic acid, trimellitic acid, pyromellitic acid and the like.

3. A polyester polyol prepared by ring-opening polymerization of cyclic ester, such as polycaprolactone, polybutyrolactone, etc.

4. A polyester polyol obtainable upon esterification of various saturated or unsaturated fatty acids with polyols.

In this invention, paperboard is impregnated with a solution of the resin in an organic solvent.

The typical solvents are toluene, xylene, various esters such as ethyl acetate, butyl acetate, cellosolve acetate, butyrocellosolve acetate, etc., ketones such as methyl ethyl ketone, acetone, etc., ethers such as butyrocellosolve ether and the like. Those solvents can be used either singly or in combination.

The viscosity of the solution of the polyurethane resin that will prove suitable is about 50 cps. or less and, more desirably, from about 1 to about 20 cps.

An amount of the resin to be impregnated may be within the range from 0.05 to 5.0, preferably, 0.1 to 3.0 weight percent relative to the paperboard. For instance, in the case of linerboard and corrugating media for use in the fabrication of corrugated boards, the preferred range is 0.4 to 1.0 weight percent.

The impregnation can be effected by such techniques as dipping and coating.

In the dipping process, the resin concentration of the bath is previously adjusted depending on the quality and shape of a material paperboard. About 2 seconds of the dipping time are sufficient.

The coating operation can be carried out by brushing-on or spraying. In a large industrial scale, it is recommended to employ such general tools as a roll coater, reverse coater, counterflow coater, gravure coater, etc., or where a highly viscous resin is used, a doctor blade or air blade, for instance.

When the rate of the resin to be impregnated is higher than 5% (weight), its folding endurance is sacrificed, whereas the paperboard is improved in rigidity and the adaptability of the paperboard to subsequent processes such as printing also is jeopardized. On the other hand, if the rate is lower than 0.05% (weight), the paperboard does not possess adequate rigidity and wet strength, which is the most vital property of paperboard.

The drying of the resin solution impregnated into paperboard can be most suitably effected by indirect heating, e.g. with use of steam. Because the substrate is paper, the temperature must be maintained below 140°C, in general, in the range of 80° to about 130°C, and in the case of gravure coating which applies to only a minor amount of the resin, it is sufficient to heat the paperboard at 130°C for about 5 seconds.

After the drying, the treated paperboard can be immediately subjected to such secondary processes as take-up, stacking, printing, assembling and trimming.

Even if the thorough drying process described above is omitted, the paperboard would not suffer from blocking, and the mechanical strength of the paperboard will come to be satisfactory by leaving it standing in air.

Experience as shown that, after the treated paperboard has been dried at 100°C for 1 minute, the strength of the paperboard has proved to be satisfactory.

The present invention is further illustrated by the following non-limitative examples.

In these examples, "part(s)" means part(s) by weight unless otherwise specified. Parts by weight bears the same relation to part(s) by volume as does gram(s) to milliliter(s). Furthermore, the dry strength of each paperboard is measured after it was allowed to stand at 20°C and 65% relative humidity for 24 hours, while its wet strength is measured after 1 hour immersion in distilled water at 20°C.

The abbreviations "D.", "W.", "M.D.", "C.D." and "M.W." means "Dry", "Wet, "Machine Direction" "Cross Direction" and "Molecular Weight", respectively. Ring-crush, bursting strength, tensile strength, tearing strength, folding endurance, air permeability and taber stiffness are measured in accordance with JIS (Japanese Industrial Standard)-p-8126, 8131, 8113, 8116, 8115, 8117 and 8125, respectively.

EXAMPLE 1

174 parts of tolylene diisocyanate (2,4-isomer/2,6-isomer=8/2) is mixed with 136 parts of polyoxypropylene glycol (M.W. 1000) and 12.7 parts of lauryl alcohol and the resulting mixture is allowed to react at 60°–70°C for 2 hours, at the end of which time the reaction mixture is cooled to 15°C. Then, a solution of 0.04 part of potassium xanthogenate in 109.1 parts of cellosolve acetate is added to the mixture, further followed by the addition of 193.6 parts of toluene. This trimerization is allowed to proceed for 4 hours, at the end of which time 0.1 part of benzoyl chloride is added to the system so as to terminate the reaction. The procedure yields a polyurethane resin(M.W.2350) containing an isocyanurate ring within its molecule, the NCO content of which is 8.6% by weight of the total resin.

Thus produced resin is diluted with toluene to prepare solutions, the resin parcent of which ranges from 0.125 to 20.0.

Jute linerboards (230g/m$^2$) are dipped in the solutions so that the linerboards are impregnated with the polyurethane resin solution. The linerboards are then dried in an oven at 100°C for 2 minutes.

The dry and wet strength of such linerboards were measured and compared with those of the untreated linerboard or linerboard having outside range of the rate of resin to be impregnated in this invention.

The results are set forth in Table 1.

Table 1

| | | Control | | | This invention | | | | | Control | |
|---|---|---|---|---|---|---|---|---|---|---|---|
| | | (A) | (B) | (C) | (D) | (E) | (F) | (G) | (H) | (I) | (J) |
| Resin percent in the dipping solution | | untreated | 0.125 | 0.25 | 1.25 | 2.5 | 5.0 | 6.25 | 10.0 | 15.0 | 20.0 |
| Impregnated resin (%) | | 0 | 0.02 | 0.06 | 0.5 | 1.1 | 2.3 | 3.0 | 4.8 | 7.5 | 10.5 |
| Ring-crush (C.D.,Kg.) | D. | 30.6 | 31.1 | 33.7 | 37.2 | 39.9 | 44.7 | 47.2 | 52.8 | 62.5 | 70.2 |
| | W. | 3.4 | 3.5 | 4.3 | 5.6 | 6.4 | 7.1 | 7.6 | 8.5 | 9.7 | 11.5 |
| Tensile strength (M.D.,Kg.) | D. | 22.5 | 22.5 | 23.0 | 23.4 | 23.5 | 25.5 | 26.2 | 27.1 | 30.1 | 31.4 |
| | W. | 2.1 | 2.3 | 3.9 | 4.9 | 5.5 | 6.5 | 7.0 | 8.1 | 9.6 | 11.3 |
| Folding endurance (MIT* tester, times,D.) | M.D. | 250 | 252 | 261 | 270 | 278 | 268 | 255 | 200 | 126 | 44 |
| | C.D. | 28 | 28 | 31 | 31 | 30 | 38 | 37 | 37 | 35 | 34 |

*Massachusetts Institute of Technology.

EXAMPLE 2

A. Production of polyurethane resin

The polyurethane resin is produced from the following starting materials according to the general procedure.

| tolylene diisocyanate (2,4-isomer/2,6-isomer=80/20) | 46 parts |
|---|---|
| trimethylol propane | 8 parts |
| castor oil | 46 parts |
| NCO content and molecular weight of polyurethane resin obtained: | |
| NCO content | 9% |
| N.W. | 1600 |

B. Impregnating process

In 20% toluene solution of the above produced polyurethane resin (viscosity 6.5 cps.) hand sheet (125 g/m$^2$, Needle Unbleached Kraft Pulp, Canadian Standard freeness 350 ml.) is dipped, and thus treated sheet is dried in an oven a 110°C for 5 minutes.

The dry and wet ring-crush of the resulting paperboard is measured and compared with those of the comparable sheets treated with the paper impregnated with conventional resins. The results are set forth in Table 2.

A. Acrylic emulsion
B. Polyamide-polyamine-epichlorhydrin resin.
C. Water-soluble melamine resin.
D. Modified polyacrylamide resin the impregnated resin shown in Table 3, and then, treated boards are air-dried.

The strength values of the boards are shown in Table 3.

Table 3

| | | Untreated | Impregnated resin (%) | | |
|---|---|---|---|---|---|
| | | | 0.4 | 0.8 | 1.2 |
| Tensile strength | D. | 23.4 | 26.8 | 27.8 | 30.3 |
| (M.D.,Kg.) | W. | 1.7 | 3.7 | 3.9 | 7.0 |
| Bursting strength | D. | 6.6 | 7.3 | 7.8 | 8.3 |
| (Kg./cm$^2$) | W. | 1.7 | 2.5 | 2.7 | 3.6 |
| Ring-cruch | D. | 28.9 | 34.6 | 41.0 | 46.9 |
| (C.D.,Kg.) | W. | 3.1 | 4.5 | 5.5 | 6.9 |
| Tearing strength (M.D.,g) | | 239 | 236 | 248 | 232 |
| Folding endurance (MIT tester;times;M.D.) | | 556 | 710 | 519 | 495 |
| Taber Stiffness (M.D.,g/cm) | | 4.4 | 5.1 | 5.9 | 6.1 |
| Water absorption (%) | | 95.1 | 72.7 | 62.2 | 53.5 |
| Air permeability (sec./100ml) | | 298 | 370 | 294 | 302 |

EXAMPLE 4

A. Production of the polyurethane resin composition

The components of the compositions are produced from the following starting materials.

| Polyisocyanate component: | |
|---|---|
| Tolylene diisocyanate | 731 parts |
| trimethylol propane | 134 parts |

Unreacted TDI is extracted with a mixture of benzene-n-hexane from the reaction mixture.

| NCO content and average molecular weight of polyisocyanate obtained: | |
|---|---|
| NCO content | 17.4% |
| M.W. | 860 |
| Polyol component: | |
| adipic acid | 438 parts |
| 1,3-butylene glycol | 180 parts |
| trimethylol propane | 277 parts |
| OH content and average molecular weight of polyol obtained: | |
| OH content | 8.8% |
| M.W. | 770 |

B. Impregnating process

Table 2

| Impregnated resin (%) | | Ring-crush (C.D.,Kg.) | | | | | | | | | | |
|---|---|---|---|---|---|---|---|---|---|---|---|---|
| | | D. | | | | | W. | | | | | |
| | | 0 | 1 | 2 | 3 | 5 | 10 | 0 | 1 | 2 | 3 | 5 | 10 |
| This invention | | 17.1 | 23.9 | 26.1 | 27.9 | 32.6 | 45.1 | 1.4 | 3.9 | 4.0 | 4.2 | 5.3 | 6.8 |
| Control | (A) | 17.1 | 18.5 | 20.1 | 21.2 | 19.9 | 16.3 | 1.4 | 1.7 | 1.8 | 1.7 | 1.9 | 1.7 |
| | (B) | 17.1 | 17.6 | 18.0 | 20.5 | 20.6 | 20.9 | 1.4 | 2.7 | 3.3 | 3.3 | 3.7 | 3.2 |
| | (C) | 17.1 | 17.8 | 18.0 | 18.3 | 18.6 | 18.7 | 1.4 | 2.3 | 2.6 | 3.0 | 3.3 | 3.5 |
| | (D) | 17.1 | 18.0 | 19.4 | 20.0 | 24.7 | 25.7 | 1.4 | 1.9 | 2.0 | 2.2 | 2.4 | 2.6 |

(Note)
The internal addition method was used for A, B and C, while the dipping method was employed for D. In the case of the internal addition method, fixation at the aluminium sulfate (0.3% as Al$_2$O$_3$ relative to absolutely dry pulp) was carried out.

EXAMPLE 3

10% toluene solution (viscosity 4.0 cps.) of polyurethane resin as same as in Example 2 is coated to jute linerboards (230g/m$^2$) by a gravure coater at the rate of In a 10% solution of the above two components in mixture of toluene and ethylacetate (1:1), the abov components being mixed at the equivalent molar rati of NCO/OH shown in Table 4, jute linerboard (230g/m$^2$) are dipped, and then, are dried by an oven a 120°C for 2 minutes. The rate of impregnated resin about 2.7%. The strength of the boards is shown b Table 4.

Table 4

| NCO/OH equivalent molar ratio | | untreated | 1/0 | 1/0.5 | 1/1 | 1/2 | 1/4 |
|---|---|---|---|---|---|---|---|
| NCO content of the composition (%) | | — | 17.4 | 12.4 | 9.7 | 6.7 | 4.2 |
| Viscosity of the dipping solution (cps.) | | — | 2.5 | 2.6 | 2.6 | 2.5 | 2.5 |
| Ring-crush (C.D., Kg.) | D. | 30.6 | 41.1 | 48.7 | 55.7 | 44.8 | 33.9 |
| | W. | 3.4 | 7.2 | 7.5 | 7.9 | 6.4 | 4.8 |
| Folding endurance (MIT tester, times M.D.) | | 250 | 163 | 237 | 268 | 252 | 262 |

EXAMPLE 5

The results of edgewise compression strength and cracking test are shown in Table 5.

Table 5

| | Viscosity (cps.) | Resin in solution (%) | Impregnated resin (%) | Edgewise Compression strength*[1] (Kg.) | | Cracking*[2] |
|---|---|---|---|---|---|---|
| | | | | D. | W. | |
| Untreated | — | — | — | 76.4 | 6.2 | 0 |
| A | 1.5 | 2.5 | 1.1 | 84.5 | 9.1 | 0 |
| B | 1.8 | 5.0 | 2.3 | 91.6 | 14.4 | 0 |
| C | 5.0 | 20.0 | 10.2 | 153.7 | 21.3 | Δ |
| D | 9.5 | 30.0 | 14.9 | 187.2 | 26.7 | X |

*[1]: "Paperboard Packaging" November 1961, page 70.
*[2]: The degree of cracking was evaluated on the basis of the condition of the bend when each corrugated board is bent to 180 degrees.
0 : Not cracked
Δ : Partially cracked
X : Cracked A. Polyurethane resin composition
The components of the composition are produced from the following starting materials.

| Polyisocyanate component: | |
|---|---|
| tolylene diisocyanate | 261 parts |
| butyl acetate | 306 parts |
| 1,3-butylene glycol | 45 parts |
| trimethylbenzylammonium hydroxide | 0.006 part |
| pentachlorophenol | 2 parts |
| benzoyl chloride | 0.3 part |
| NCO content and average molecular weight of the produced polyisocyanate having isocyanurate ring: | |
| NCO content | 13.7% |
| M.W. | 3000 |
| Polyol component: | |
| castor oil | 1000 parts |
| trimethylol propane | 422 parts |
| phthalic acid anhydride | 444 parts |
| OH content and average molecular weight of the polyester polyol obtained: | |
| OH content | 5.9% |
| M.W. | 1730 |

B. Impregnating process
In 20% an equal-weight mixture of above two components which is mixed at the equivalent molar ratio of NCO/OH of 0.94/1, (calculated NCO content of the composition: 6.8%) corrugated boards (B-flute) are dipped, and dried in an oven at 130°C for 2 minutes.

EXAMPLE 6

The ethylacetate solutions of the following polyurethane resins are impregnated to jute linerboards (230g/m²) by the same coating manner as in Example 3 and by the same dipping manner as in Example 1.

The strength of the treated boards with the resin are measured and the results are set forth in Table 6.

A. A polyurethane resin (M.W. 3500) derived from 3000 parts of poyoxypropylene triol (initiator: trimethylol propane, M.W. 3000) and 522 parts of tolylene diisocyanate.

B. A polyurethane resin (M.W. 1670) derived from 1044 parts of tolylene diisocyanate, 134 parts of trimethylol propane and 3000 parts of polyoxypropylene glycol (initiator: propyleneglycol, M.W. 2000)

C. A polyurethane resin derived from the same materials as in Example 1.

D. A polyurethane resin (M.W. 1200) derived from

| trimethylol propane | 8.5 parts |
|---|---|
| polyoxypropylene glycol (M.W. 1000) | 10.5 parts |
| tolylene diisocyanate | 31.0 parts |

E. A polyurethane resin being the same polyisocyanate component as in Example 4.

Table 6

| | | | NCO content (%) | Impregnated resin(%) | Ring; crush (Kg.) | | Tensile strength(Kg.) | | | | Folding endurance (MIT tester, times) | |
|---|---|---|---|---|---|---|---|---|---|---|---|---|
| | | | | | C.D. D. | C.D. W. | M.D. D. | M.D. W. | C.D. D. | C.D. W. | M.D. D. | C.D. D. |
| (A) | Untreated | | — | — | 29.1 | 3.4 | 16.6 | 1.4 | 6.9 | 0.6 | 16 | 5 |
| | Coating | | 3.7 | 0.4 | 31.3 | 3.7 | 16.9 | 2.6 | 6.9 | 1.0 | 15 | 5 |
| | Resin percent of the dipping solution | 5 | 3.7 | 1.4 | 32.3 | 5.0 | 17.5 | 3.6 | 7.1 | 1.5 | 15 | 4 |
| | | 10 | 3.7 | 2.5 | 33.8 | 5.4 | 17.7 | 4.3 | 7.1 | 1.8 | 15 | 4 |
| | Coating | | 6.0 | 0.4 | 30.5 | 3.7 | 17.1 | 2.7 | 7.1 | 1.0 | 17 | 5 |

Table 6-continued

| | | NCO content (%) | Impregnated resin(%) | Ring; crush (Kg.) | | Tensile strength(Kg.) | | | | Folding endurance (MIT tester, times) | |
|---|---|---|---|---|---|---|---|---|---|---|---|
| | | | | C.D. D. | C.D. W. | M.D. D. | M.D. W. | C.D. D. | C.D. W. | M.D. D. | C.D. D. |
| (B) | Resin percent of the dipping solution | 5 | 6.0 | 3.4 | 32.9 | 4.7 | 17.8 | 3.7 | 7.4 | 1.6 | 16 | 5 |
| | Coating | | 8.4 | 0.4 | 33.8 | 4.4 | 19.8 | 2.7 | 8.0 | 2.1 | 24 | 9 |
| (C) | Resin percent of the dipping solution | 5 | 8.4 | 3.7 | 45.4 | 7.4 | 23.7 | 6.4 | 9.6 | 2.8 | 16 | 6 |
| | | 10 | 8.4 | 6.7 | 56.4 | 9.0 | 26.4 | 8.6 | 11.1 | 3.7 | 6 | 3 |
| | Coating | | 12.4 | 0.4 | 34.8 | 4.4 | 18.7 | 2.6 | 7.7 | 1.3 | 22 | 8 |
| (D) | Resin percent of the dipping solution | 5 | 12.4 | 3.7 | 42.9 | 7.4 | 20.1 | 6.0 | 8.1 | 2.5 | 18 | 6 |
| | | 10 | 12.4 | 7.1 | 49.3 | 9.1 | 22.1 | 7.8 | 9.1 | 2.9 | 7 | 4 |
| | Coating | | 17.4 | 0.4 | 30.6 | 4.4 | 17.8 | 2.6 | 7.5 | 2.0 | 7 | 5 |
| (E) | Resin percent of the dipping solution | 5 | 17.4 | 4.5 | 39.6 | 6.8 | 19.1 | 4.8 | 7.6 | 2.0 | 6 | 4 |
| | | 10 | 17.4 | 7.4 | 44.9 | 8.3 | 20.8 | 5.2 | 8.3 | 2.2 | 6 | 4 |

EXAMPLE 7

Jute linerboards (230g/m²) treated by the following polyisocyanate in the same manner as in Example 1 have satisfactory strength for practical use.

Table 7

| | Component (mole parts) | | NCO content | M.W. | Functionality |
|---|---|---|---|---|---|
| (A) | tolylene diisocyanate | 3 | | | |
| | polyoxypropylene triol (M.W. 500) [initiator: trimethylol propane] | 1 | 12.3 | 1022 | 3 |
| (B) | tolylene diisocyanate | 7 | | | |
| | trimethylol propane | 2 | 11.8 | 1790 | 5 |
| | polyoxypropylene glycol (M.W. 300) | 1 | | | |
| | tolylene diisocyanate | 5 | | | |
| | polyoxypropylene glycol (M.W.2000) | 0.34 | 5.3 | 3940 | 5 |
| (C) | (M.W. 3000) | 0.34 | | | |
| | lauryl alcohol (produced polyisocyanate has isocyanurate ring) | 0.34 | | | |
| | tolylene diisocyanate | 13.5 | | | |
| (D) | polyoxypropylene glycol (M.W. 200) | 7.5 | 5.5 | 1980 | 2.6 |
| | Castor oil | 1.6 | | | |

What we claim is:

1. A paperboard impregnated with 0.05 to 5.0 weight percent of a polyurethane resin relative to the weight of the paperboard, said polyurethane resin being impregnated as a solution in an organic solvent therefor, said polyurethane resin being a polyisocyanate wherein the correlation between the NCO content and molecular weight is defined by area A in the Figure, said polyisocyanate being obtained by:

reacting tolylene diisocyanate with
a polyether polyol produced by reacting an alkylene oxide with a diol having a low molecular weight, triol having a low molecular weight, tetraol or a mixture of any of the said polyether polyols with a polyalkylene glycol.

2. A paperboard claimed in claim 1, wherein said polyisocyanate is obtained by:

1. reacting at least one tolylene diisocyanate selected from the group consisting of 2,4- and 2,6-tolylene diisocyanate and mixtures thereof with
a polyether polyol produced by reacting an alkylene oxide with at least one diol selected from the group consisting of ethylene glycol, propylene glycol and butylene glycol or at least a triol selected from the group consisting of glycerin, trimethylolpropane and 1,2,6-hexanetriol or castor oil or at least one tetraol selected from the group consisting of erythritol and pentaerythritol or a mixture of any of said polyether polyols with at least one polyethylene glycol, polypropylene glycol and polytetramethylene glycol.

3. A paperboard impregnated with 0.05 to 5.0 weight percent of a polyurethane resin relative to the weight of the paperboard, said polyurethane being impregnated as a solution in an organic solvent therefore, said polyurethane resin being a polyisocyanate wherein the correlation beween the NCO content and molecular weight is defined by area A in the Figure, said polyisocyanate being a trimer having an isocyanurate ring in its molecule, said trimer being obtained by:

trimerizing a reaction product obtained by reacting tolylenediisocyanate with a polyether polyol produced by reacting an alkylene oxide with a diol having a low molecular weight, triol having a low molecular weight, tetraol or a mixture of any of the said polyetherpolyols with a polyalkylene glycol.

4. A paperboard as claimed in claim 3, wherein said reaction product is obtained by:

reacting at least one tolylene diisocyanate selected from the group consisting of 2,4- and 2,6-tolylene diisocyanate or mixtures with a polyether polyo produced by reacting an alkylene oxide with a least one diol selected from the group consisting o ethylene glycol, propylene glycol and butylene glycol or at least a triol selected from the group consisting of glycerin, trimethylolpropane and 1,2,6-hexanetriol or castor oil or at least one tetraol selected from the group consisting of erythritol and pentaerythritol or a mixture of any of the said polyether polyols with at least one polyethylene glycol, propylene glycol or polytetramethylene glycol.

5. A paperboard as claimed in claim 1, wherein the weight percent of the polyurethane resin therein is 0.1 to 3 weight percent relative to the weight of the paperboard.

* * * * *

UNITED STATES PATENT OFFICE
CERTIFICATE OF CORRECTION

Patent No. 3,953,169           Dated April 27, 1976

Inventor(s) Seiichi Igarashi, Kin-ichi Shirakawa, Kazuo Kimura and Akira Ogino

It is certified that error appears in the above-identified patent and that said Letters Patent are hereby corrected as shown below:

Page 1, first column, line "[73]", after "Takeda Chemical Ind., Ltd., Japan", insert:

-- and Rengo Co., Ltd., Japan --.

Signed and Sealed this

Tenth Day of August 1976

[SEAL]

Attest:

RUTH C. MASON
Attesting Officer

C. MARSHALL DANN
Commissioner of Patents and Trademarks